United States Patent [19]
Hobson et al.

[11] Patent Number: 5,445,906
[45] Date of Patent: Aug. 29, 1995

[54] METHOD AND SYSTEM FOR CONSTRUCTING A RECHARGEABLE BATTERY AND BATTERY STRUCTURES FORMED WITH THE METHOD

[75] Inventors: David O. Hobson, Oak Ridge; William B. Snyder, Jr., Knoxville, both of Tenn.

[73] Assignee: Martin Marietta Energy Systems, Inc., Oak Ridge, Tenn.

[21] Appl. No.: 285,166

[22] Filed: Aug. 3, 1994

[51] Int. Cl.⁶ .................. H01M 6/12; H01M 6/46
[52] U.S. Cl. .................... 429/162; 429/94; 29/623.3; 29/623.5; 29/730
[58] Field of Search ............... 429/162, 94, 152; 29/623.1, 623.3, 623.5, 730

[56] References Cited

U.S. PATENT DOCUMENTS

| | | | |
|---|---|---|---|
| 3,694,368 | 9/1972 | Bergum | 29/623.3 |
| 4,173,066 | 11/1979 | Kinsman | 29/623.1 |
| 4,177,552 | 12/1979 | Gordon et al. | 29/623.4 |
| 4,197,635 | 4/1980 | Bilhorn | 29/623.5 |

*Primary Examiner*—Anthony Skapars
*Attorney, Agent, or Firm*—Michael E. McKee; J. Donald Griffin; Harold W. Adams

[57] ABSTRACT

A method and system for manufacturing a thin-film battery and a battery structure formed with the method utilizes a plurality of deposition stations at which thin battery component films are built up in sequence upon a web-like substrate as the substrate is automatically moved through the stations. At an initial station, cathode and anode current collector film sections are deposited upon the substrate, and at another station, a thin cathode film is deposited upon the substrate so as to overlie part of the cathode current collector section. At another station, a thin electrolyte film is deposited upon so as to overlie the cathode film and part of the anode current collector film, at yet another station, a thin lithium film is deposited upon so as to overlie the electrolyte film and an additional part of the anode current collector film. Such a method accommodates the winding of a layup of battery components into a spiral configuration to provide a thin-film, high capacity battery and also accommodates the build up of thin film battery components onto a substrate surface having any of a number of shapes.

23 Claims, 2 Drawing Sheets

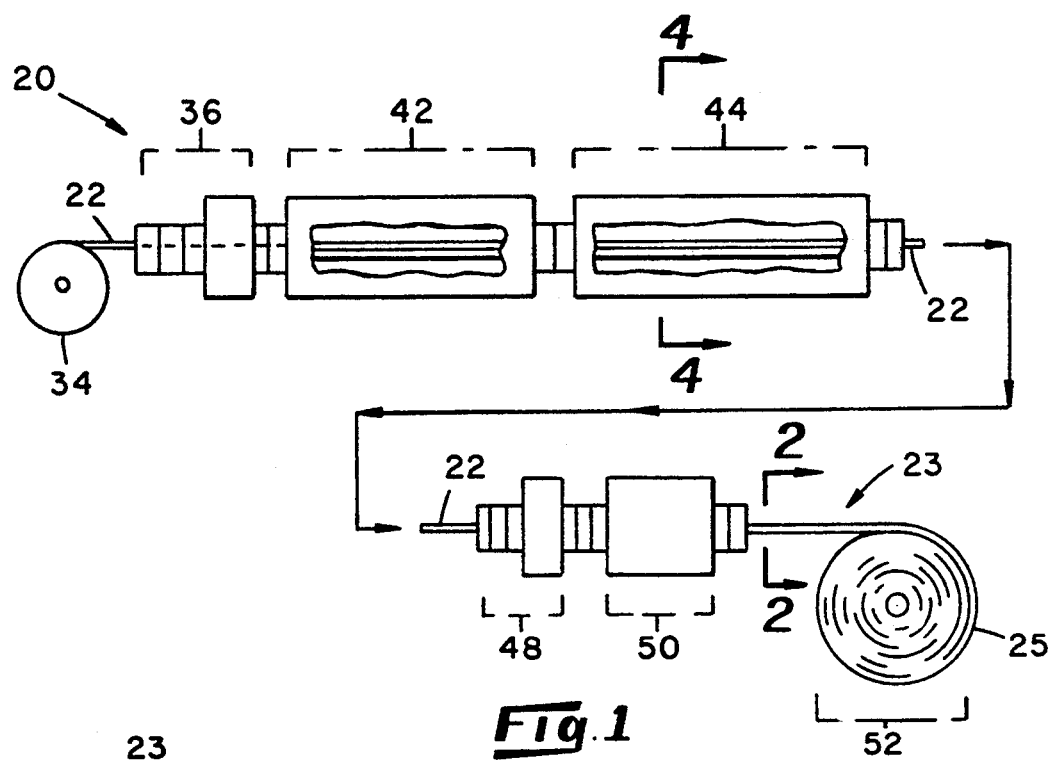
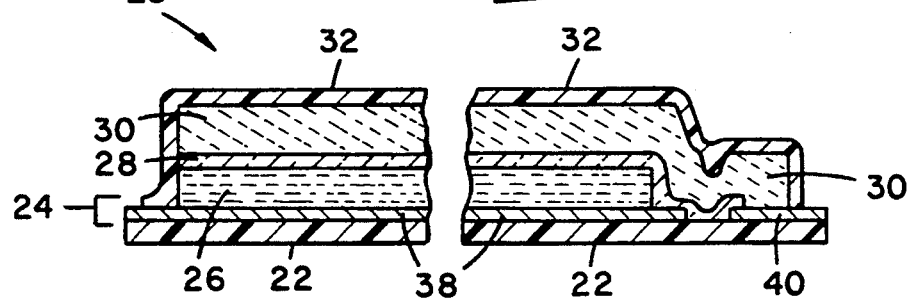
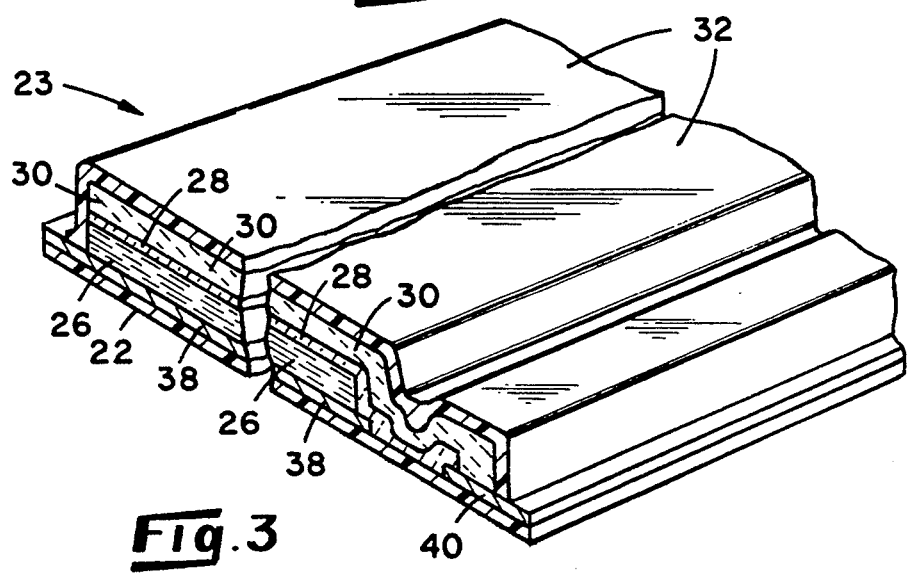

5,445,906

METHOD AND SYSTEM FOR CONSTRUCTING A RECHARGEABLE BATTERY AND BATTERY STRUCTURES FORMED WITH THE METHOD

BACKGROUND OF THE INVENTION

This invention relates generally to batteries and relates, more particularly, to the structure and methods of manufacture of rechargeable solid-state thin-film batteries.

The type of rechargeable battery with which this invention is concerned includes a thin-film cathode, a thin-film lithium anode and a thin-film electrolyte disposed between the cathode and anode. A battery of this class is distinguishable from lithium batteries which utilize a solid polymer or lithium ion technology during construction in that it is a completely solid-state device. An example of a thin-film battery of the class with which this invention is concerned is described in application Ser. No. 07/921,528, now abandoned, having the same assignee as the instant invention and whose disclosure is incorporated herein by reference.

Heretofore, batteries such as those described in the referenced application have been produced on a relatively small scale, i.e. typically having a total area (in plan) of a few square centimeters and having a total thickness within the range of between six to eight micrometers ($\mu$m), yet have been found to possess a relatively high energy capacity, i.e. about 120 $\mu$Ah/cm$^2$-$\mu$m of cathode volume. To date, however, these batteries have been manufactured with techniques involving time-consuming batch type deposition processes and are not very large for applications requiring high power. For example, a single substrate, such as a glass microscope slide, is sequentially coated (with appropriate masking) with vanadium by dc magnetron sputtering, with $V_2O_5$ by reactive dc magnetron sputtering, with a lithium phosphorous oxynitride electrolyte by reactive rf sputtering, and with lithium by evaporation. The resulting cell is then commonly coated with a thin-film protective layer, thus ending a total time of construction (or time of deposition) of about twenty-four hours for a single cell.

It is an object of the present invention to provide a new and improved method of manufacturing a thin-film lithium battery of the aforedescribed class in a relatively short period of time and a battery structure manufactured in accordance with the method.

One more object of the present invention is to provide such a method wherein the construction of a battery of the aforedescribed class can be scaled up to any of a broad range of sizes and/or capacities to take advantage of the potentially high energy density of this class of battery.

Still one more object is to provide such a method which may be employed to manufacture batteries in large quantities.

Another object of the present invention is to provide such a method which accommodates the construction of a very compact, high capacity battery suited for use in high power applications.

Still another object of the present invention is to provide such a method which accommodates the winding of a layup of thin-film battery components into a spiral configuration and accommodates the build up of thin-film battery components onto a foundation, e.g. substrate support surface, having any of a number of shapes.

Yet another object of the present invention is to provide such a battery having a layup of thin-film components which are wound in a spiral configuration.

A further object of the present invention is to provide such a battery having a layup of thin-film components which are built up upon a substrate support surface having any of a number of various shapes.

A still further object of the present invention is to provide a system with which the method of the invention can be carried out.

SUMMARY OF THE INVENTION

This invention resides in a method and system for building up thin-film battery components in a layup arrangement wherein the layup includes a cathode film, an electrolyte film and a lithium anode film, and a battery structure formed with the method.

The method includes the steps of moving the surface of a substrate through one station at which a cathode material is deposited in a thin film upon the surface as the substrate is moved through the one station, moving the substrate surface through another station at which an electrolyte material is deposited in a thin film over the cathode film as the substrate is moved through the another station, and then moving the substrate surface through yet another station at which lithium is deposited in a thin film over the electrolyte film as the substrate is moved through the yet another station.

In one embodiment of the method, cathode and anode current collector film sections are deposited upon the substrate surface as the substrate is moved through an initial station, and the depositions of the cathode and anode films are controlled at the subsequent stations, with appropriate masking, so that the deposited cathode film contacts the cathode current collector (but no part of the anode current collector) and so that the deposited anode film contacts the anode current collector (but no part of the cathode current collector). If desired, the substrate can be moved through still another station where the layup of cathode, electrolyte and anode films are coated with a thin film protective layer.

The system of the invention includes means disposed at a first station for depositing a thin cathode film onto the surface of a substrate as the substrate is moved through the first station and means disposed at a second station for depositing a thin electrolyte film over the deposited cathode film as the substrate is moved through the second station. The system also includes means disposed at a third station for depositing a thin lithium anode film over the deposited electrolyte film as the substrate is moved through the third station and means for moving the substrate surface in sequence through the first, second and third stations so that thin cathode, electrolyte and lithium anode films are built up in sequence upon the substrate surface.

BRIEF DESCRIPTION OF THE DRAWINGS

FIG. 1 is a schematic view of an embodiment of a system with which a thin-film lithium battery structure can be manufactured.

FIG. 2 is a cross-sectional view of a battery structure taken about along line 2—2 of FIG. 1.

FIG. 3 is a fragmentary perspective view of the battery section illustrated in FIG. 2.

DETAILED DESCRIPTION OF ILLUSTRATIVE EMBODIMENTS

Figure 4:
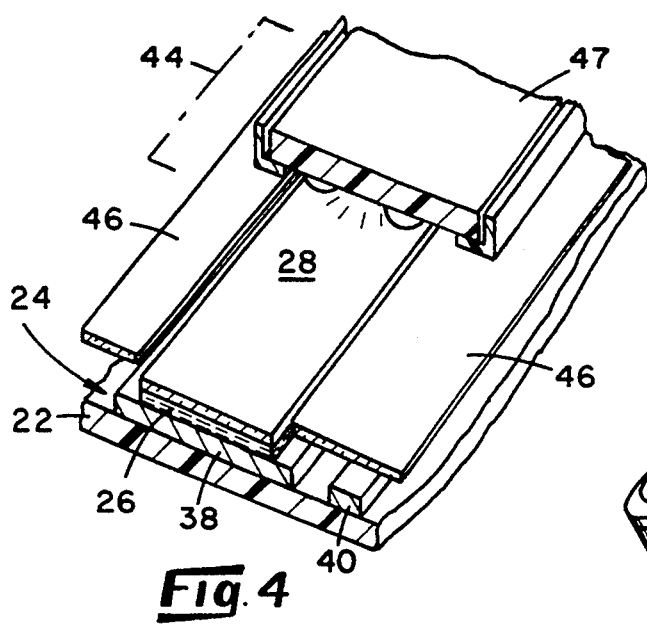
FIG. 4 is a perspective view of a fragment of the FIG. 1 system as viewed generally about line 4—4 of FIG. 1.

Turning now to the drawings in greater detail, there is shown in FIG. 1 an embodiment, generally indicated 20, of a system with which a battery-constructing method can be carried out. The system 20 includes a plurality of film-deposition stations, i.e. five stations described herein, within which thin film layers (providing the components of a thin-film battery) are built up in sequence onto the surface of a web 22. To this end, commercially existing apparatus have been adapted for the purpose of making a battery in accordance with the method of this invention by providing with the apparatus a network of coating chambers and appropriate vacuum interlocks. Moreover, the stations are tailored so that the length of time that the web 22 spends at each deposition station is inversely proportional to the rate at which each battery layer is built up. Therefore, by automatically routing the web 22 endwise through the deposition stations wherein one film is deposited at each station over the film deposited in the preceding station, the resulting product includes a layup of components comprising a thin-film battery.

As shown in FIGS. 2 and 3, the battery structure, indicated 23, which exits the last deposition stage of the system 20 includes the web 22, a current collector film 24 overlying the web surface, a thin-film cathode 26 overlying a portion of the collector film 24, a thin-film electrolyte 28 overlying the cathode film 26, a thin-film lithium anode 30 overlying the electrolyte film 28 and a portion of the current collector film 24 and a thin-film protective coating 32 overlying the lithium film 30.

Figure 5:
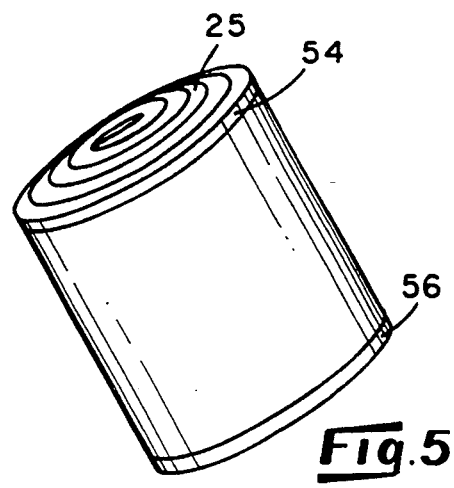
FIG. 5 is a view of a wound battery structure formed with the system of FIG. 1.

The web 22 used in the depicted embodiments of FIGS. 1 and 2 provides the underlying substrate upon which each of the aforementioned battery component films are deposited in sequence and may be comprised of any of a number of materials, such as a polymer, suitable for use as a battery-supporting substrate. Since the web 22 is eventually wound, with the battery-providing layers supported thereon, into a spiral configuration 25 as shown in FIG. 5, the web 22 possesses a degree of flexibility to accommodate the winding process. Moreover, since the web 22 is positioned closely to the lithium anode film in the wound condition of the web 22, the material comprising the web 22 is preferably compatible, i.e. non-reactive, with lithium. If the web material is not compatible with lithium, an appropriate protective coating can be chosen and coated over the lithium film so that when the web 22 is wound, the protective coating 32 prevents the lithium film 30 from being directly contacted by the web material. In the layup of the battery structure 23 of FIGS. 2 and 3, the lithium anode film 30 is prevented from directly contacting the web 22 upon which it is supported by the electrolyte film 28.

With reference again to FIG. 1, the web 22 is supported in a roll 34 situated adjacent the entrance to the first deposition station 36 and fed endwise into the stations from the roll 34. The web 22 is relatively thin, e.g. between 3 and 6 $\mu$m thick, as measured between its opposite faces, is as long (in the wound roll 34) as is needed to form the desired battery structure 25, and its width corresponds to the desired height (as measured between its opposite ends) of the battery 25. Current commercial web-coating apparatus are capable of handling web widths of about 80.0 inches, so the upper range of the web width may be constrained by the width-handling capabilities of the deposition stations.

The stations of the system 20 include a first station 36 at which a thin film of an appropriate current-collecting material, such as vanadium, is deposited in a thin (two-part) layer 24 upon the surface of the web 22. To this end, the current-collector film 24 may be deposited by rf or dc magnetron sputtering of vanadium in argon, vacuum evaporation or other such film-deposition process common, for example, to the semiconductor industry. Accordingly, the deposition equipment mounted at the first station 36 is adapted to deposit the desired layer.

As best shown in FIG. 2, the current-collector film 24 includes two spaced portions 38 and 40. One portion 38 underlies so as to be in direct contact with (in the completed battery structure 25) the cathode film 26 for serving as the current collector for the cathode, and the other portion 40 underlies so as to be in direct contact with a portion of the lithium anode layer 30 for serving as the current collector for the anode. In order that the portions 38 and 40 of the film layer 24 are deposited upon the web 22 in the desired spaced relation, an appropriate mask is mounted in the first station 36 to prevent the deposited current-collector material from covering the surface of the web 22 along which a gap is desired between the portions 38 and 40.

The system 20 also includes a second station 42 within which a thin coating of a cathode material, such as an amorphous vanadium-oxide ($V_2O_5$), is deposited in a film 26 over a desired region of the current-collector film or, more specifically, over the collector film portion 38. To this end, an appropriate mask is supported in the second station so that only the collector film portion 38, and none of the collector film portion 40, is coated by the cathode material deposited at the second station 42. By way of example, a vanadium-oxide, such as $V_2O_5$, can be deposited as a 1 micron thick film over the current collector film portion 38 by sputtering vanadium in argon plus about 14% $O_2$.

At a third station, indicated 44, of the system 20, the electrolyte film 28 is deposited over the cathode coating 26 and part of the current collector film portion 40. A material found to be well-suited as the electrolyte is an amorphous lithium phosphorous oxynitride, such as $Li_xPO_yN_z$ (wherein x is about 3.3, y is about 3.8, and z is between about 0.16 and 0.46) which has been developed by the assignee of the present invention. This material is an $N_2$-impregnated $Li_3PO_4$ glass which can be deposited over the cathode by sputtering of $Li_3PO_4$, lithium orthophosphate, in nitrogen at low pressure. Accordingly, the deposition equipment situated at the third station 44 is adapted to deposit the desired electrolyte material onto the cathode film 26 as the web 22 is moved through the station 44. To protect the side edges (including a major part of the current collector film portion 40) from being contacted by deposited electrolyte, appropriate masks 46 (FIG. 4) are mounted in the third station 44 (generally beneath the linear magnetron 47 situated thereat) so as to protect these areas from the electrolyte material being deposited thereon as the web is advanced through the station 44.

At the fourth station 48 of the system 20, there is mounted appropriate deposition equipment for depositing the thin film 30 of lithium over the electrolyte film 28 and the current collector film portion 40. By way of example, the lithium coating may be sputtered in place, and accordingly, the deposition equipment mounted in the fourth station is adapted to perform the desired deposition operation. The system 20 also includes a fifth station 50 at which the thin-film protective coating is deposited over the lithium anode 30. The protective coating 32 is compatible with lithium and may be, for example, a polymeric material, so that the deposited coating 32 seals the lithium film 30 from exposure to air or moisture.

Upon exiting the fifth, and final, deposition station 50, the web 22 supports all of the film components needed for an operating thin-film battery and is wound at a winding station 52 into the desired spiral configuration. Since the current collector film portion 38 is accessible at one end, indicated 54 in FIG. 5, of the spiral configuration 25, and the current collector film portion 40 is accessible at the opposite end, indicated 56, of the FIG. 5 configuration, the positive and negative terminals of the battery configuration 25 can be disposed at the opposite battery ends 54 and 56.

To summarize a battery-constructing operation with the system 20, the flexible web 22 is moved endwise in sequence through the first, second, third, fourth, and fifth stations where the desired films are built up in sequence upon the surface of the web 22. Depending upon the material being deposited at the stations, deposition processes such as magnetron sputtering, reactive magnetron sputtering and evaporation may be employed at the deposition stations. To this end, the deposition stations include separately-pumped vacuum and deposition chambers and appropriate apparatus so that the deposition atmospheres are isolated from one another. After the web 22 is coated with the battery component films, the web 22, with the films supported thereon, are wound at the winding station 52 into the desired spiral configuration 25. It follows that the afore-described process produces a device that is the power source itself. More specifically, the layup of battery components are deposited in a continuous manner, with each successive layer building upon the next, into whatever length (and therefore, area) of battery cell is desired. It can then be wound to produce a battery cell whose capacity scales directly to the volume of cathode contained in the battery. If desired, the battery size can be scaled to provide the power for small-power applications, such as a digital wristwatch, portable applications, such as cameras, camcorders, cassette recorders, or CD players, or to provide sufficient power for a larger application, such as an electrically-powered vehicle.

A unique feature of both the manufacturing process and the battery described above is the capability of taking what is essentially a microfabrication technology and using it to make a battery with almost any desired capacity, or voltages in multiples of a single cell. Another unique feature is the extraordinary energy density and specific energy of the battery. The continuous process by which the battery is made, the spiral-wound geometry, and the light weight of the components enable the fabrication of a battery that is uniquely different from any product on the market. In addition, batteries can be produced by the process in forms that are not presently available; from conformally-applied batteries to batteries applied around a hollow core, wherein the core could contain the powered item.

Preferably, the thinness of the deposited layers allows them to bend elastically as the web is wound. When the configuration 25 reaches its desired diameter, the web 22 is appropriately cut or otherwise severed to finish the configuration 25, and the configuration is suitably capped to provided positive and negative terminals. It follows that the web material forms both the foundation for the battery and the electrical insulation between successive winds of the spiral-wound configuration.

Figure 6:
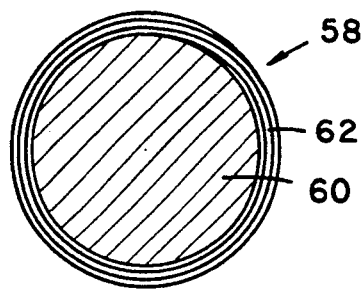
FIG. 6 is a radial cross-sectional view of another battery structure embodiment.
Figure 7:
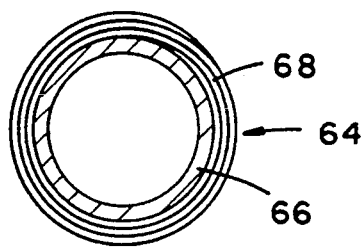
FIG. 7 is a radial cross-sectional view of still another battery structure embodiment.

If at least one of the film components is relatively brittle (such as is the $Li_xPO_yN_2$ electrolyte mentioned earlier or the ceramic cathode), care should be taken to ensure that winding is effected in the elastic range of the material. While the thinness of the built up composite structure, e.g. between 8 and 14 μm, allows for a relatively short-radius bending to be achieved, it may be preferable to wind the battery films around a core of preselected diameter (sufficiently large to render bending in the elastic range) to reduce the likelihood of damage to the brittle film components. For example, there is shown in FIG. 6 an alternative embodiment of a battery structure, generally indicated 58, including a solid cylindrical core 60 about which a battery-forming layup 62 are wrapped. Still further, there is shown in FIG. 7 another embodiment of a battery structure, generally indicated 64, including a hollow cylindrical core 66 about which a battery-forming layup 68 is wrapped. (In the FIG. 7 embodiment 64, the walls of the core 66 could provide the container for electrical equipment that the battery 64 might be required to power.)

To further reduce the likelihood of tension cracking of the battery films, the web 22 may be wound into its desired spiral configuration with the deposited layers disposed on the concave side of the web to ensure that the brittle layers are in a compressive stress state. In addition, it is possible by varying the deposition conditions, such as pressure, substrate temperature, ion energies, etc., a film may be deposited into place in either a compressive state or a tensile state. This may be advantageous in that the wound condition of the final product may be designed to relieve, to a degree, the as-deposited stresses. If, for example, the film is deposited in a tension state, then bending could relieve that tension and create a less stressful state in the final, i.e. wound, condition.

For an integrated, continuous battery manufacturing process, a constant web velocity through the deposition stations should be maintained. However, since the rate of deposition of the various film materials are likely to be different, appropriate schemes must be adopted at the stations to ensure that the desired amount of film material is deposited at the stations. For example, in the exemplary battery structure 23 described above, the deposition of Li by evaporation occurs at the fastest rate, while the $Li_xPO_yN_z$ layer requires the longest time to deposit. Present deposition practices yield times approximately in the ratios 1.1, 9, 12 and 1 for V, $V_2O_5$, $Li_xPO_yN_2$ and Li, respectively. By employing multiple deposition targets along the web path, in the same ratios as those provided above, so that the web is exposed to each deposition station for the appropriate length of time, the web can be moved at a constant velocity through the deposition stations. Thus, in the preferred system, the lengths of the deposition zones are approximately proportional to the times required for the buildup of each battery layer.

It follows from the foregoing that the system 20 can be used to manufacture a thin-film battery in a continuous process wherein each battery film is deposited as a long strip on the surface of a battery-supporting substrate and each film strip is deposited, or built up, in an appropriate position upon a previously-deposited strip. Moreover, a battery constructed in accordance with the aforedescribed method is provided with the relatively high capacity that conventional (batch-deposited) thin film batteries normally possess (because the cathode thicknesses of the batteries are approximately the same), yet is capable of being constructed much more quickly than the thin film batteries constructed by batch processing techniques. Electrical resistance considerations preclude any substantial increase in cathode thickness, so the large cathode areas needed for useful battery capacity are obtained by the aforedescribed deposition of the battery layers sequentially onto a moving web so that the final length (used in the calculation of the total area of the composite structure) can be as long as is desired (or necessary) to achieve a desired battery capacity.

By way of example, the electrical characteristics of a battery having the configuration of the battery 58 of FIG. 6 (including windings about a core) can be calculated. For calculation purposes, the total length of the composite web equals the sum of the circumferences of the windings. Assuming the average density of the battery/web substrate composite (6 $\mu$m thick polymer) to be about 1.94 g/cc, the active width of the battery, i.e. the cathode width, to be 4 cm (0.04 m), and that the battery is wound with 1000 turns on a 6 mm diameter core, the final battery diameter is about 32 mm. The total length of the web can be calculated to be approximately 59.7 m which, in turn, gives an active volume, including the web substrate, of about 31 cm$^3$. The active weight, at 1.94 g/cm$^3$, of such a battery is 60.3 g. Moreover, the capacity of the battery, using a published value wherein 1 mAh is produced by a cathode 2 $\mu$m thick$\times$4.2 cm$^2$, equals 5.7 Ah, and, assuming that the average voltage during discharge is 2.5 v, there is provided (2.5 v)$\times$(5.7 Ah), or 14.25 Wh for the energy stored in the battery. Finally, the energy density can be calculated as (14.25 Wh)/(0.031 L), or 459.7 Wh/L, and the specific energy can be calculated as (14.25 Wh)/(0.0603 kg), or 236.3 Wh/kg.

By further way of example, a cylinder made up of a battery deposited on a web of 3 $\mu$m thickness, wound on a hollow shell with an outer diameter of approximately 6.0 inches, with an active length of about 1.0 feet and a winding thickness of about 0.25 inches is calculated to have a capacity of 210 Ah. This translates to 595 Wh/L and 273 Wh/kg. The weight of the active part of the battery would be approximately 1.9 kg, with an active volume of about 0.88 L.

It will be understood that numerous modifications and substitutions can be had to the aforedescribed embodiments without departing from the spirit of the invention. In accordance with the broader aspects of the invention, this technology is capable of scaling up the thin-film, solid-state lithium battery in a wide variety of sizes and capacities, and voltages can be selected by appropriate series interconnections. Moreover, there are a number of paths that can be followed to scale the microbattery up to a larger size and capacity and, while they all involve the deposition of layers sequentially onto a substrate, they are not limited to those methods described herein. Other methods could include, but are not limited to, laser ablation, ion bombardment, and many more. Further, the web-handling procedures described in connection with the system 20 can vary according to the needs of the process.

Furthermore, although the aforedescribed battery embodiments 58 and 64 of FIGS. 6 and 7 are shown and described as including battery component layers which are wound around the surface of a cylindrical core, the battery component layers may be wound around alternatively-shaped foundations which could, for example, be square or rectangular in cross section, with rounded corners.

Figure 8:
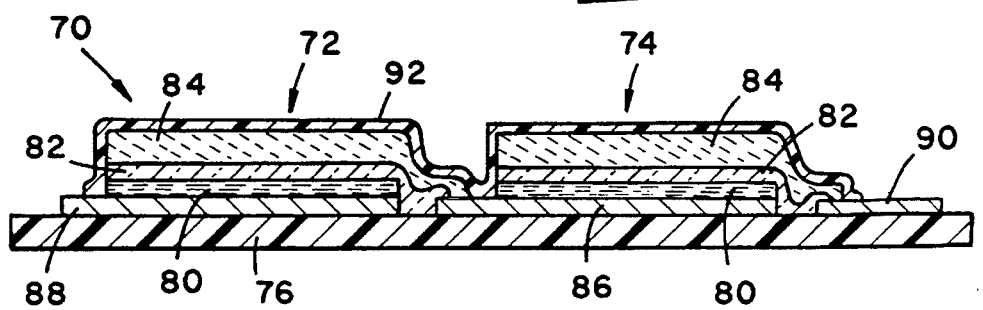
FIG. 8 is a transverse cross-sectional view of yet another battery structure embodiment.

Further still, although the aforedescribed battery embodiments of FIGS. 2-7 have been shown and described as including a layup of battery components including long strips of cathode, electrolyte, and anode films which are unbroken and continuous as a path is traced along the width of the underlying web, there is illustrated in FIG. 8, a battery structure embodiment, generally indicated 70, which includes a pair of battery layup arrangements 72 and 74 which overlie a common web 76. Each layup 72 or 74 includes a cathode layer 80, an electrolyte layer 82 and an anode layer 84, and the layups 72 and 74 are connected in series with one another by way of a current collector film 86 which is in contact with the anode film 84 of one layup 72 and the cathode layer 80 of the other layup 74. Additional current collector films 88 and 90 are in contact, respectively, with the cathode film 80 of one layup 72 and the anode layer 84 of the other layup 74 for providing the current collectors for the battery structure 70. During the manufacture of the battery structure 70, the cathode films 80 are deposited, with appropriate masks, in parallel strips and the interconnections between the layups 72 and 74 are effected with deposited anode material. Further still, a series of cells could be deposited side by side, as in the aforedescribed embodiment structure 70, and subsequently separated into individual batteries.

Accordingly, the aforedescribed embodiments are intended for the purpose of illustration and not as limitation.

We claim:

1. A method for building up thin-film battery components in a layup arrangement wherein the layup includes a cathode film, an electrolyte film and a lithium anode film, the method comprising the steps of:
    moving the surface of a substrate through one station at which a cathode material is deposited in a thin film upon the surface as the-substrate is moved through the one station;
    moving the substrate surface through another station at which an electrolyte material is deposited in a thin film over the cathode film as the substrate is moved through the another station; and
    then moving the substrate surface through yet another station at which lithium is deposited in a thin film over the electrolyte film as the substrate is moved through the yet another station.

2. The method as defined in claim 1 wherein substrate surface is relatively lengthy as measured along the path of movement of the surface so that as one region of the substrate surface is exposed to the film material being deposited at one of the stations, another region of the substrate surface is exposed to the film material being deposited at a different station.

3. The method as defined in claim 1 wherein the substrate surface is provided by the surface of a flexible web.

4. The method as defined in claim 3 wherein the step of moving the substrate surface through yet another station is followed by a step of winding the web and the layup of battery components borne by the web into a wound arrangement.

5. The method as defined in claim 1 wherein the substrate material is a web having two opposite faces, and the moving steps moves the web material endwise in sequence through the stations so that the films are deposited in sequence upon one face of the web.

6. The method as defined in claim 5 wherein the web is flexible and the moving steps are followed by the step of winding the film-carrying web upon itself so that in the wound configuration, one section of the film-carrying web overlies another section of the film-carrying web.

7. The method as defined in claim 1 wherein the moving steps are preceded by a step of moving the substrate surface through an initial station at which current collector material is deposited in two thin film sections upon the substrate surface, and the subsequent step of moving the substrate surface through the one and another stations effects a build up of the cathode and electrolyte films over one of the current collector thin film sections and the step of moving the substrate surface through the yet another station effects a build up of the lithium film over the electrolyte film and the other current collector thin film section.

8. The method as defined in claim 1 wherein the moving steps are followed by an additional step of moving the substrate surface through still another station at which a protective coating is deposited in a thin film over the lithium anode as the substrate is moved through the still another station.

9. A battery structure whose layup of components are built up in accordance with the method of claim 1.

10. A method for constructing a thin film battery including the steps of:
providing a substrate having a surface;
providing, at a first station, means for depositing a thin cathode film onto the substrate surface as the surface is moved through the first station;
providing, at a second station, means for depositing a thin electrolyte film over the cathode film as the surface is moved through the second station;
providing, at a third station, means for depositing a thin lithium anode film over the electrolyte coating as the surface is moved through the third station; and
automatically moving the substrate surface through the first, second and third stations so that the thin cathode, electrolyte and lithium anode films are built up in sequence upon the substrate surface.

11. The method of claim 10 wherein the substrate surface is relatively long in length as measured along the path of movement of the surface so that during at least one moment of the moving step, portions of the substrate surface are situated at more than one of the three stations.

12. The method as defined in claim 10 wherein the substrate surface is provided by the surface of a flexible web.

13. The method as defined in claim 12 further comprising a step of providing, at a final station, means for winding the web and the layup of battery components borne thereby into a wound arrangement, and the step of moving moves the web and the layup of battery components borne thereby through the final station.

14. The method as defined in claim 10 wherein the substrate material is a web having two opposite faces, and the moving step moves the web material endwise in sequence through the stations so that the films are deposited in sequence upon one face of the web.

15. The method as defined in claim 14 wherein the web is flexible and the moving step is followed by the step of winding the film-carrying web upon itself so that in the wound configuration, one section of the film-carrying web overlies another section of the film-carrying web.

16. The method as defined in claim 10 further comprising the step of providing, at an initial station, means for depositing a current collector material in two thin film sections upon the substrate surface as the surface is moved through the initial station, and the step of moving the substrate surface through the stations moves the surface through the initial station before the surface is moved through the first station so that the current collector film sections are deposited upon the substrate before the cathode film is deposited thereon.

17. The method as defined in claim 10 further comprising the step of providing, at a subsequent station, means for depositing a protective coating upon the substrate surface as the surface is moved therethrough and the step of moving the substrate through the stations moves the surface through the subsequent station after the surface is moved through the third station so that the protective coating is deposited upon the deposited lithium film.

18. A thin-film battery constructed in accordance with the method of claim 10.

19. In a rechargeable, thin-film battery including a substrate surface, a thin cathode film overlying the substrate surface, a thin electrolyte film overlying the cathode surface and a thin lithium anode film overlying the electrolyte film, the improvement characterized in that:
the substrate surface is provided with a flexible web, the cathode film, electrolyte film and anode film are supported in a layup arrangement along the surface of the web, and the web and the layup of films supported thereby are wound in a wound arrangement.

20. The improvement as defined in claim 19 wherein the substrate and the film layup carried thereon is in a wound configuration so that one section of the layup-carrying substrate overlies another section of the layup-carrying substrate.

21. The improvement as defined in claim 13 wherein the substrate and the film layup carried thereby is wound around the surface of a core of material.

22. A system for building up a layup of thin film battery components comprising:
means disposed at a first station for depositing a thin cathode film onto the surface of a substrate as the substrate is moved through the first station;
means disposed at a second station for depositing a thin electrolyte film over the deposited cathode film as the substrate is moved through the second station;

means disposed at a third station for depositing a thin lithium anode film over the deposited electrolyte film as the substrate is moved through the third station; and means for moving the substrate surface in sequence through the first, second and third stations so that thin cathode, electrolyte and lithium anode films are built up in sequence upon the substrate surface.

23. The system as defined in claim 22 wherein the means for moving includes means for automatically moving the web through the stations.

* * * * *